United States Patent
Renduchintala et al.

(10) Patent No.: US 9,911,349 B2
(45) Date of Patent: Mar. 6, 2018

(54) SYSTEM AND METHOD FOR LANGUAGE INSTRUCTION USING VISUAL AND/OR AUDIO PROMPTS

(75) Inventors: Adithya Renduchintala, Boulder, CO (US); Robin Smith, Harrisonburg, VA (US)

(73) Assignee: ROSETTA STONE, LTD., Harrisonburg, NJ (US)

( * ) Notice: Subject to any disclaimer, the term of this patent is extended or adjusted under 35 U.S.C. 154(b) by 313 days.

(21) Appl. No.: 13/163,193

(22) Filed: Jun. 17, 2011

(65) Prior Publication Data

US 2012/0322034 A1    Dec. 20, 2012

(51) Int. Cl.
G09B 5/06    (2006.01)
G09B 19/06    (2006.01)

(52) U.S. Cl.
CPC .............. G09B 5/06 (2013.01); G09B 19/06 (2013.01)

(58) Field of Classification Search
CPC ...................................................... G09B 19/06
USPC ............... 364/513.5, 900, 419; 434/156–185
See application file for complete search history.

(56) References Cited

U.S. PATENT DOCUMENTS

| | | | |
|---|---|---|---|
| 5,010,495 A * | 4/1991 | Willetts | 704/235 |
| 5,885,083 A * | 3/1999 | Ferrell | 434/156 |
| 7,613,616 B2 * | 11/2009 | Luisi | 704/275 |
| 2002/0086269 A1 * | 7/2002 | Shpiro | 434/156 |
| 2004/0176960 A1 * | 9/2004 | Shpiro et al. | 704/277 |
| 2006/0161440 A1 * | 7/2006 | Nakayama et al. | 704/270 |
| 2007/0015121 A1 * | 1/2007 | Johnson et al. | 434/156 |
| 2008/0152094 A1 * | 6/2008 | Perlmutter | 379/88.01 |
| 2013/0041670 A1 * | 2/2013 | Morgan et al. | 704/275 |

FOREIGN PATENT DOCUMENTS

| | | |
|---|---|---|
| WO | 2000022597 A1 | 4/2000 |
| WO | 200043975 A1 | 7/2000 |
| WO | WO2005099414 A2 | 10/2005 |

OTHER PUBLICATIONS

Vivien, Angelique, "International Application No. PCT/US2012/042883 Search Report", dated Nov. 2, 2012, Published in: WO.

* cited by examiner

*Primary Examiner* — James Hull
(74) *Attorney, Agent, or Firm* — Baker & McKenzie LLP (57) ABSTRACT

A system and method for language instruction for implementation on a language instruction system that includes a computer system, is disclosed, wherein the method may include identifying a speech segment in a target language, that is susceptible to mispronunciation by language learners; selecting an auditory attribute for use in playing the identified speech segment by the language instruction system; altering a level of the auditory attribute to differ from a naturally occurring level of the attribute; and playing a first text sequence by the language instruction system, including at least one instance of the identified speech segment, using the altered level of the auditory attribute.

10 Claims, 10 Drawing Sheets

SYSTEM AND METHOD FOR LANGUAGE INSTRUCTION USING VISUAL AND/OR AUDIO PROMPTS

BACKGROUND OF THE INVENTION

The present invention relates generally to teaching machines and, more particularly concerns a system and method for teaching a language.

Traditional methods for teaching a language, in particular a foreign language, are far from enjoyable for students. Students spend a great deal of time learning rules of grammar and syntax and generally learn by memorizing words in the target language (the language being learned) that are translations of corresponding words in a source language. The only exposure to correct pronunciation might be on a recording or during discussions in a classroom. On such occasions, the student finds himself mentally composing his recitation in his native language and then translating it. The usual result is a halting, stilted recital, replete with grammatical and syntactic errors introduced by the translation process. The foregoing approach generally does not enable the language learner to converse fluently in the target language.

In contrast, upon first learning a language, young children are fully immersed in a natural learning process in which they learn words, grammar and syntax interactively through deductive reasoning, in context, and by emulating others. In time, children develop a flowing communication style, without the need to translate or to be concerned about rules. It would be desirable to be able to emulate this kind of learning process in learning a second language.

Systems of teaching a user language using immersion are known to some extent in the prior art. However, to best measure the user's progress, the language student should be prompted to speak naturally. Simply showing the user target language text to be read aloud is less than optimum, because read speech is not spoken the same way as natural speech not being read. Thus, attempting to gauge student progress by measuring an ability to read prepared text is generally not effective.

Accordingly, there is a need in the art for an improved system and method for language instruction that better emulates the immersion environment in which children typically learn their first language.

SUMMARY OF THE INVENTION

According to one aspect, the invention is directed to a method of teaching a target language to a language student, wherein the method may include the steps of presenting display information on a display device of a computer system, the display information illustrating a sequence of activity within an instructional environment; prompting the student with audio and/or visual information to submit audible input in the target language to affect activity within the instructional environment; submitting a command by the student in response to the prompt; decoding the command by the computer system; and implementing the student command within the instructional environment.

According to another aspect, the invention is directed to a method for implementation on a language instruction system that includes a computer system, wherein the method may include identifying a speech segment in a target language that is susceptible to mispronunciation by language learners; selecting an auditory attribute for use in playing the identified speech segment by the language instruction system; altering a level of the auditory attribute to differ from a naturally occurring level of the attribute; and playing a first text sequence by the language instruction system, including at least one instance of the identified speech segment, using the altered level of the auditory attribute.

According to yet another aspect, the invention is directed to a language instruction method for implementation on a language instruction system that includes a computer system, wherein the method may include identifying at least two speech segments in a target language susceptible to being pronounced similarly by a language student; increasing the pitch level of a first of the speech segments with respect to a normally occurring pitch level of the first speech segment, in a first audio file within the language instruction system; decreasing the pitch level of a second one of the speech segments with respect to a normally occurring pitch level of the second speech segment, in a second audio file within the language instruction system; and playing a first text sequence by the language instruction system, including at least one instance of the identified speech segment, using the increased and decreased pitches of the first and second speech segments, respectively.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
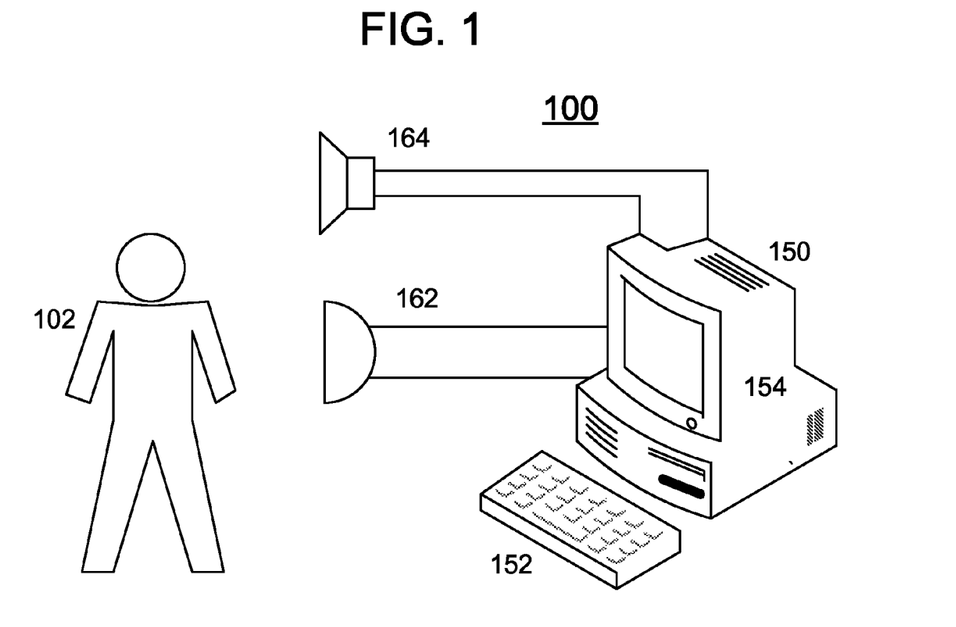
FIG. 1 is a schematic block diagram of a language instruction system including a computer system and audio equipment suitable for practicing an embodiment of the present invention.

FIG. 1 is a schematic block diagram of a language instruction system 100 including a computer system 150 and audio equipment suitable for teaching a target language to student 102 in accordance with an embodiment of the present invention. Language instruction system 100 may interact with one language student 102, or with a plurality of students. Language instruction system 100 may include computer system 150, which may include keyboard 152 (which may have a mouse or other graphical user-input mechanism embedded therein) and/or display 154, microphone 162 and/or speaker 164. Language instruction system 100 may further include additional suitable equipment such as analog-to-digital converters and digital-to-analog converters to interface between the audible sounds received at microphone 162, and played from speaker 164, and the digital data indicative of sound stored and processed within computer system 150.

The computer 150 and audio equipment shown in FIG. 1 are intended to illustrate one way of implementing an embodiment of the present invention. Specifically, computer 150 (which may also referred to as "computer system 150") and audio devices 162, 164 preferably enable two-way audio-visual communication between the student 102 (which may be a single person) and the computer system 150.

In one embodiment, software for enabling computer system 150 to interact with student 102 may be stored on volatile or non-volatile memory within computer 150. However, in other embodiments, software and/or data for enabling computer 150 may be accessed over a local area network (LAN) and/or a wide area network (WAN), such as the Internet. In some embodiments, a combination of the foregoing approaches may be employed. Moreover, embodiments of the present invention may be implemented using equipment other than that shown in FIG. 1. Computers embodied in various modern devices, both portable and fixed, may be employed including but not limited to Personal Digital Assistants (PDAs), cell phones, among other devices.

Figure 2:
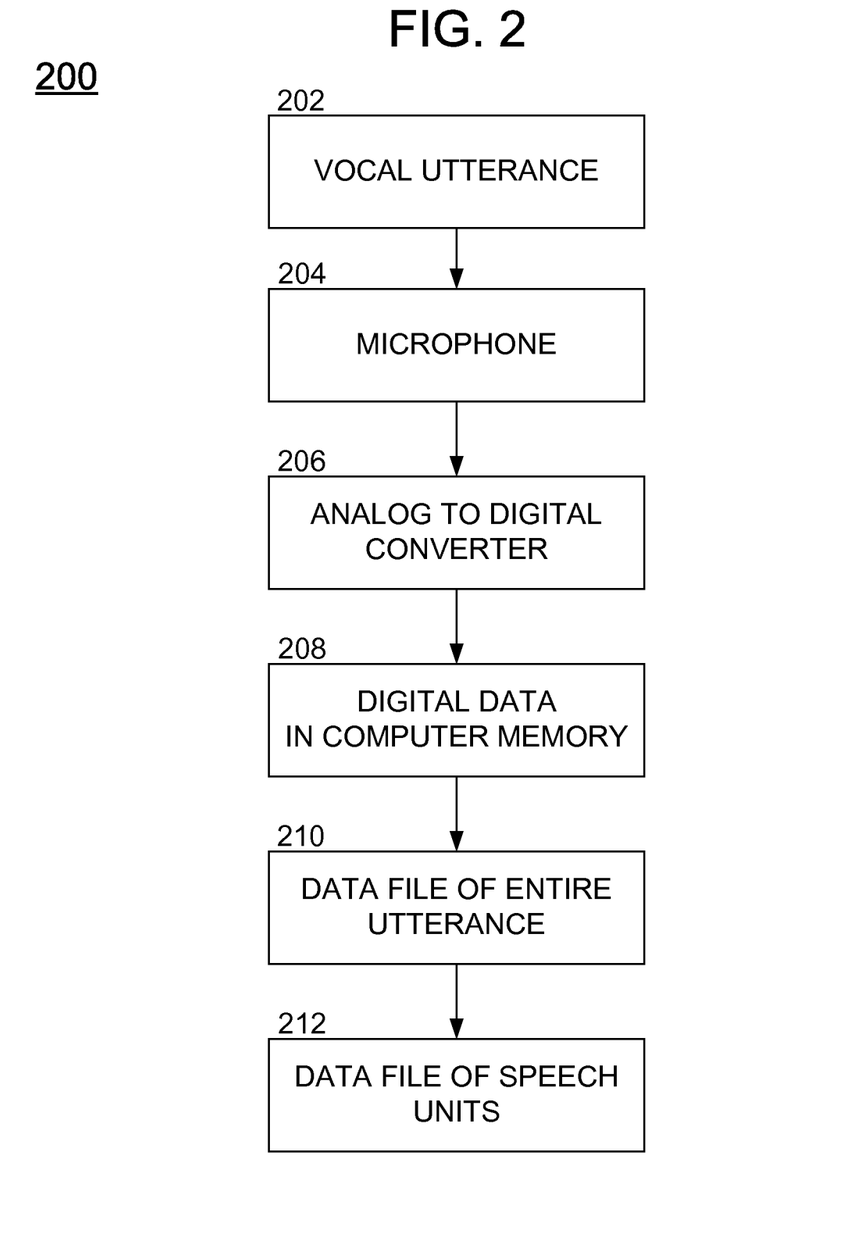
FIG. 2 is a block diagram of a system for generating computer data files representative of audible speech, from a vocal utterance, in accordance with an embodiment of the present invention.

FIG. 2 is a block diagram of a system 200 for generating computer data files representative of audible speech, such as sample utterances by language students and/or by native speakers in accordance with an embodiment of the present invention. FIG. 2 is provided to list and identify the various types of signals and information as well as the audio and data processing equipment that may be employed in accordance an embodiment of the present invention.

At block 202, a speaker, who may be a language learner (i.e. a student), a native speaker providing a sample reading of a block of text, or an instructor, provides a vocal utterance. The vocal utterance, which is preferably spoken at a normal conversational volume level is preferably directed to a microphone 204. The microphone 204 preferably converts the audible sound of the utterance (also referred to herein as a speech sample) into an analog electrical signal representative of the audible utterance. The analog signal is preferably transmitted from microphone 204 to Analog-to-Digital Converter (ADC) 206 where the analog signal is preferably converted into digital data suitable for storage and manipulation by a digital computer, such as computer 150 of FIG. 1. In some embodiments, the microphone 204 and the ADC 206 may be incorporated within a single enclosure for the sake of convenience. In one embodiment ADC 206 may sample the analog data at 16 KHz (Kilohertz) using 16-bit resolution. However, in other embodiments, sampling rates lower than or greater than 16 KHz and may be used. Moreover, resolution higher than or lower than 16-bit resolution may be employed.

At step 208, the digital data obtained at the digital side of ADC 206 is preferably transmitted to a computer memory device for temporary and/or long-term storage so that the data is accessible to programs operating within computer 150. The digital data emerging from ADC 206 is preferably accumulated so as to provide a data file 210 representing an entire utterance (speech sample), that may, for example, represent an entire spoken English sentence (or still longer text portion) in a single data file (or plural data files) that is readily accessible to hardware and/or computer software seeking to access and/or manipulate the digital speech data. Thereafter, the digital speech data within data file 210 may be decomposed into speech units (also referred to herein as "speech segments") accompanied by suitable identifiers of the respective speech units, or otherwise accessed and manipulated to obtain data indicative of characteristics of the speech sample.

Figure 3:
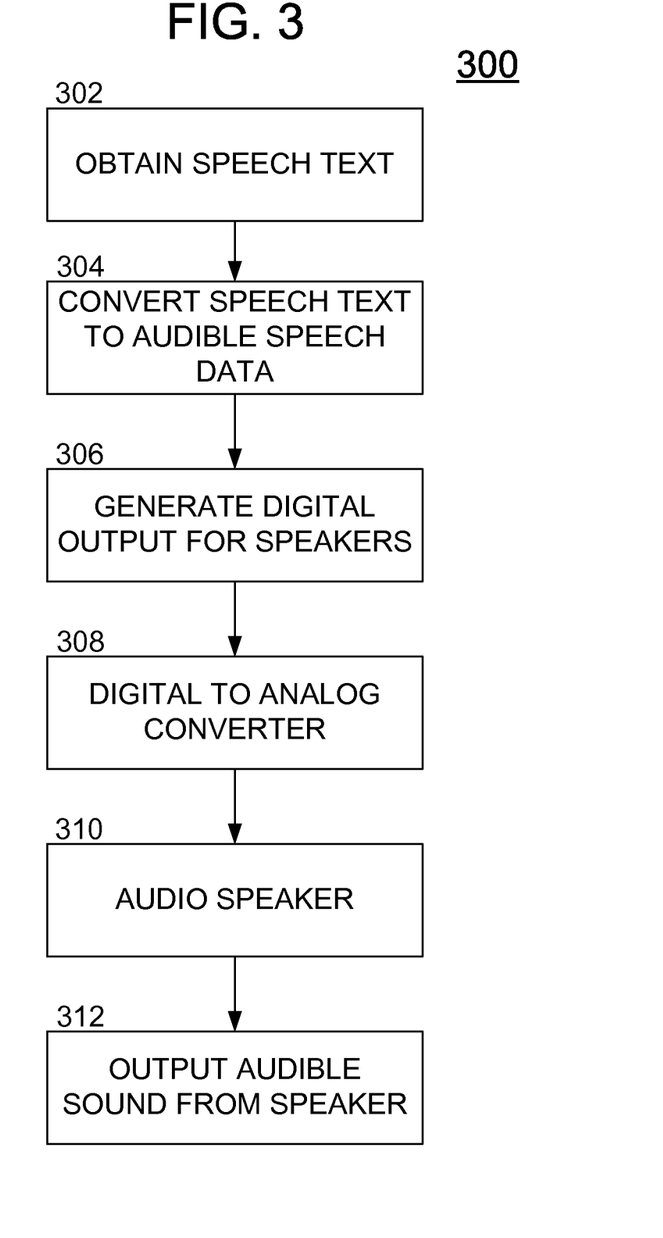
FIG. 3 is a block diagram of a system and method for converting text, which may be encoded in computer-readable form, into audible machine-generated sound using suitable data conversion apparatus and methods in accordance with an embodiment of the present invention.

FIG. 3 is a block diagram of a system and method 300 for converting text into speech using suitable data conversion apparatus and methods in accordance with an embodiment of the present invention. At step 302, a computing system, such as computer system 150, preferably obtains speech text in machine-readable form from a suitable computer memory or other source. At step 304, the computer system 150 preferably converts the speech text into audible speech data. At step 306, the data from step 304 may be further processed, as needed, to generate digital data indicative of sounds to be played from an audio speaker 164. Thereafter, the data from step 306 may be sent to an Digital to Analog Converter (DAC) to generate signals suitable for physically driving speaker 164 in step 310. At step 312, speaker 164 is caused to play audible baseband sound in response to the analog signals arising from step 308.

Figure 4:
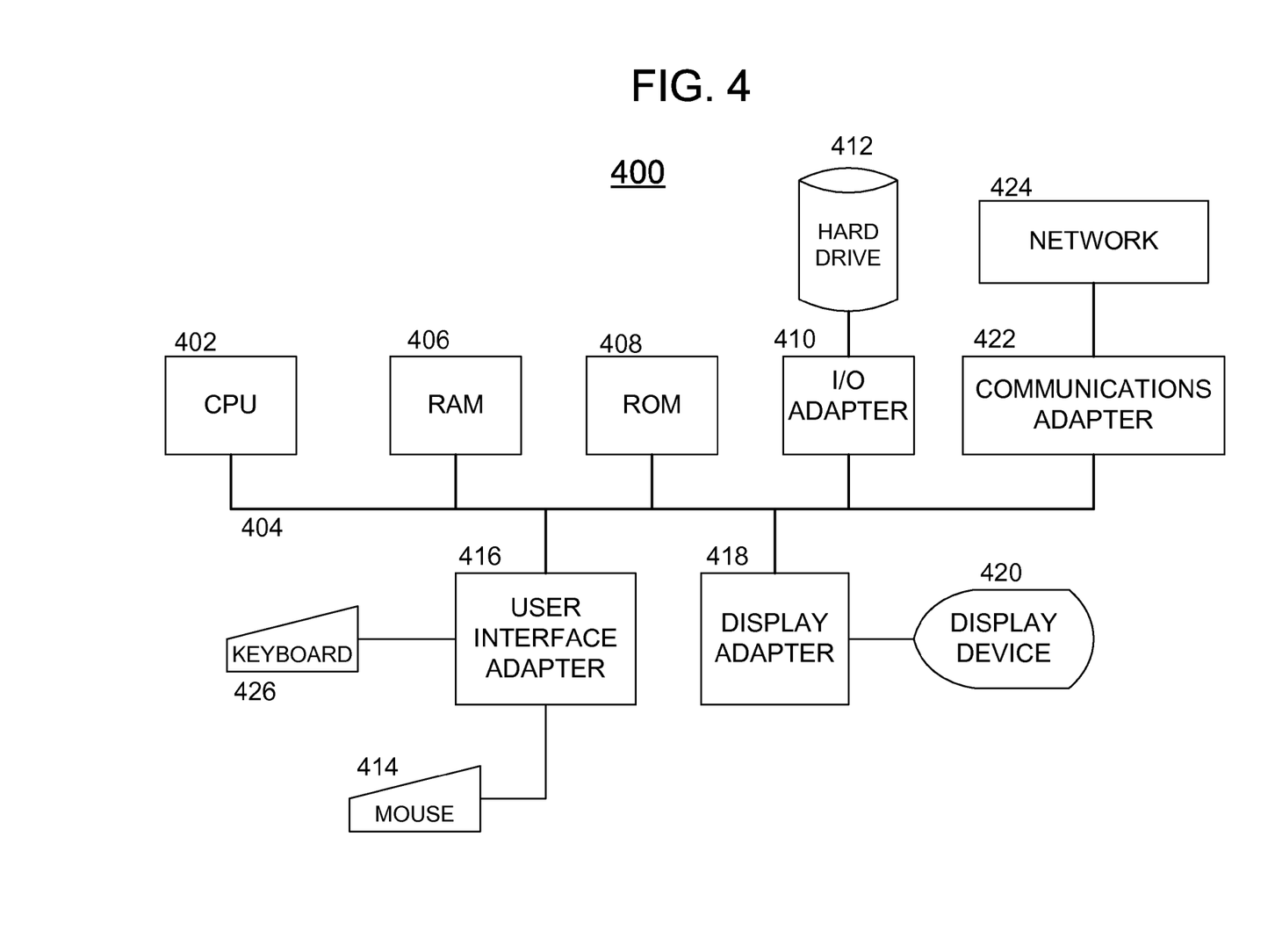
FIG. 4 is a block diagram of a computer system usable in conjunction with one or more embodiments of the present invention.

FIG. 4 is a block diagram of a computing system 400 adaptable for use with one or more embodiments of the present invention. Computer system 400 may generally correspond to computer system 150 of FIG. 1. Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs. I/O adapter 410 may connect storage devices, such as hard drive 412, a CD-ROM (not shown), or other mass storage device to computing system 600. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

Figure 5:
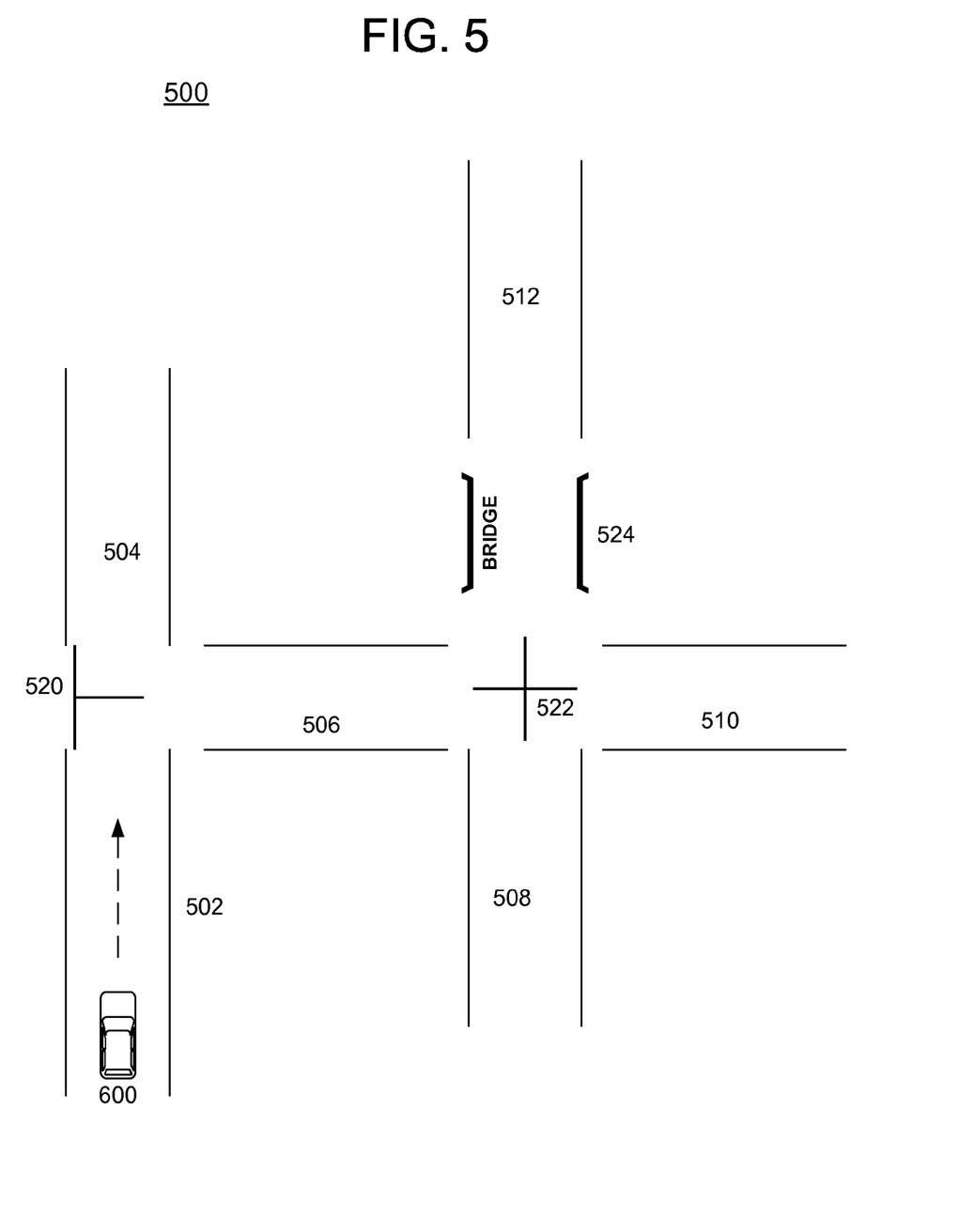
FIG. 5 is a schematic diagram of a road system serving as an mechanism for prompting a language student to utter commands operable to simulate the navigation of a vehicle through the road system in accordance with an embodiment of the present invention.

FIG. 5 shows a system of roads and intersections including a vehicle 600 suitable for being controlled by user utterances. The road system 500 may include roads 502, 504, 506, 508, 510, and 512; intersections 520 and 522, and bridge 524.

Road system 500 is used in the below example to aid in illustrating an aspect of the present invention. Specifically, a language student is prompted either visually or audibly to utter an audible command to control the activity of vehicle 600 within road system 500. Uttering commands in this manner tends to train the language student to use terms directly related to an activity within a particular context, rather than merely translating words or phrases from the native language of the student to a target language.

Alternatively, a method according the present invention may require the language student to enter terms that are merely associated with the meaning of the ultimate command, but where the uttered terms don't directly correspond to the meaning of the command.

With regard to FIGS. 5-8, road system 500 as shown in this sequence of FIGURES may be displayed on a computer screen or other suitable display device, and audio prompts or other information may be deployed to play audio information to the language student. FIGS. 5-8 emulate the illustration of a sequence of activity within an instructional environment that may be provided to a language student using live-motion video and, optionally, an audio component as well. Microphones are preferably also deployed to enable utterances by the student to be received by computer system 150 for processing.

Vehicle 600 is initially situated at a the lower left of FIG. 5, at an entry point for road segment 502. System 100 preferably prompts student 102 to utter a command to enable vehicle 600 to progress through road system 500. This prompt may be in the form of an audible invitation to have student 102 speak. Alternatively, a visual prompt such as flashing the image of vehicle 600 on and off, or changing the color or other graphical attribute of vehicle 600 may be employed in addition to, or in place of the audio prompt.

After the prompt, student 102 may utter a literal command such as "proceed" or "drive straight" to cause vehicle 600 to move to a subsequent position within road system 500 at which another decision and/or command is needed. Alternatively, system 100 may expect, and student 102 may provide, a non-literal command interpreted by system 100 as meaning "drive" or "go forward" or the like. In this example, the generic utterance "vehicle task one" is one example of an audible command that could be uttered by student 102 to cause vehicle 600 to proceed from the start of road segment 502 to the next stopping point in road system 500. As with the foregoing step, the following steps may also be implemented by having student 102 utter terms associated with literal terms. However, for the sake of brevity, the remaining commands in this example are provided using literal language.

Figure 6:
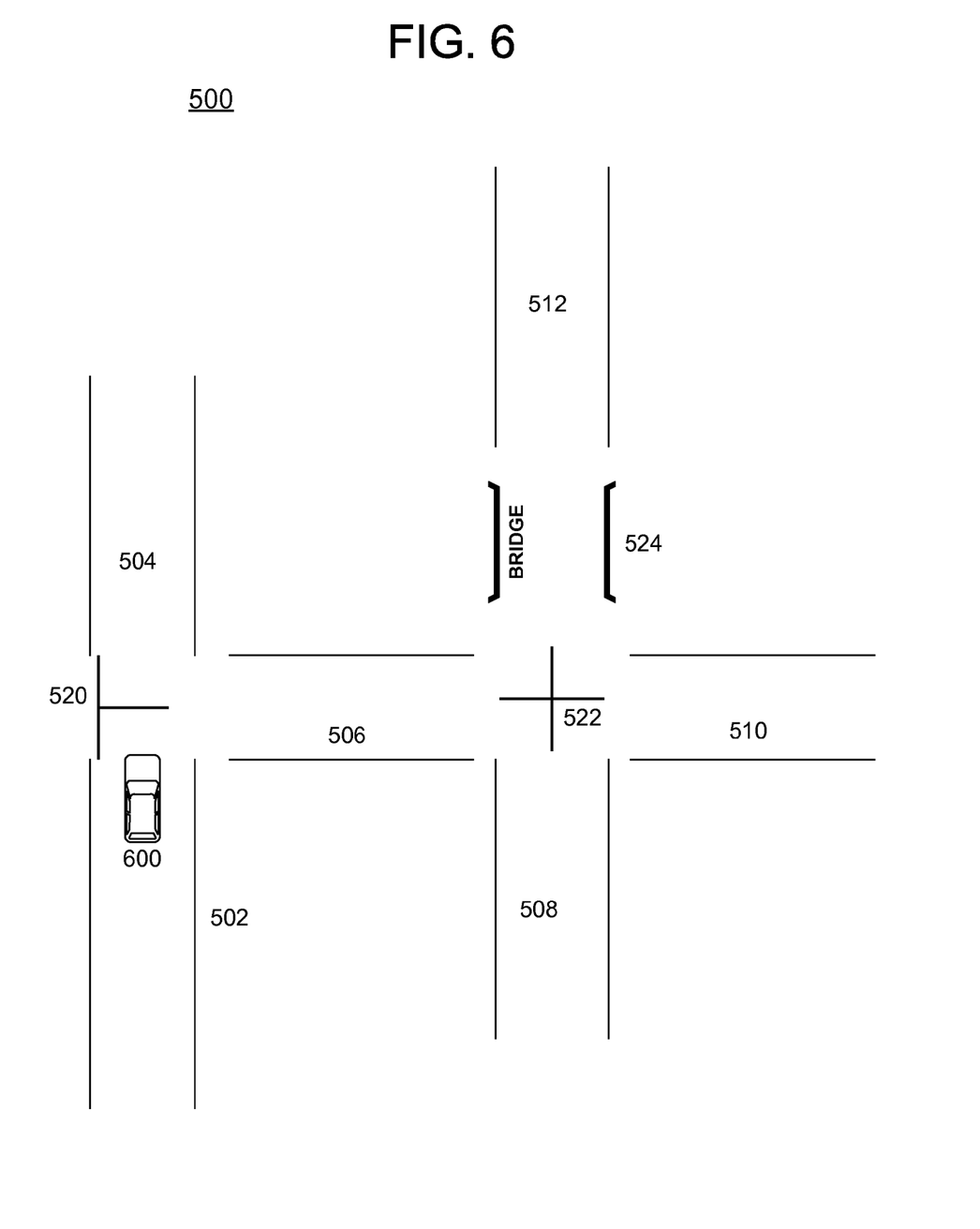
FIG. 6 is the schematic diagram of FIG. 5, in which the vehicle has advanced in accordance with an audible instruction from a language student.

After student 102 utters the command "drive" or suitable equivalent, computer system 150 preferably adjusts the graphic of road system 500 to the condition shown in FIG. 6, showing vehicle 600 at intersection 520.

Directing attention to FIG. 6, vehicle 600 is now at intersection 520, and a decision may be made to pursue at least two possible navigation options: (a) proceeding straight through intersection 520 toward the start of road segment 504; and (b) turning right at intersection 520 and proceeding along road segment 506. System 150 may prompt student 102, visually and/or audibly, to decide what vehicle 600 should do at intersection 520. In this example, student 102 utters the literal instruction "turn right" or suitable equivalent, and vehicle 600 then turns right at intersection 520, and proceeds along road segment 506 to four-way intersection 522.

Figure 7:
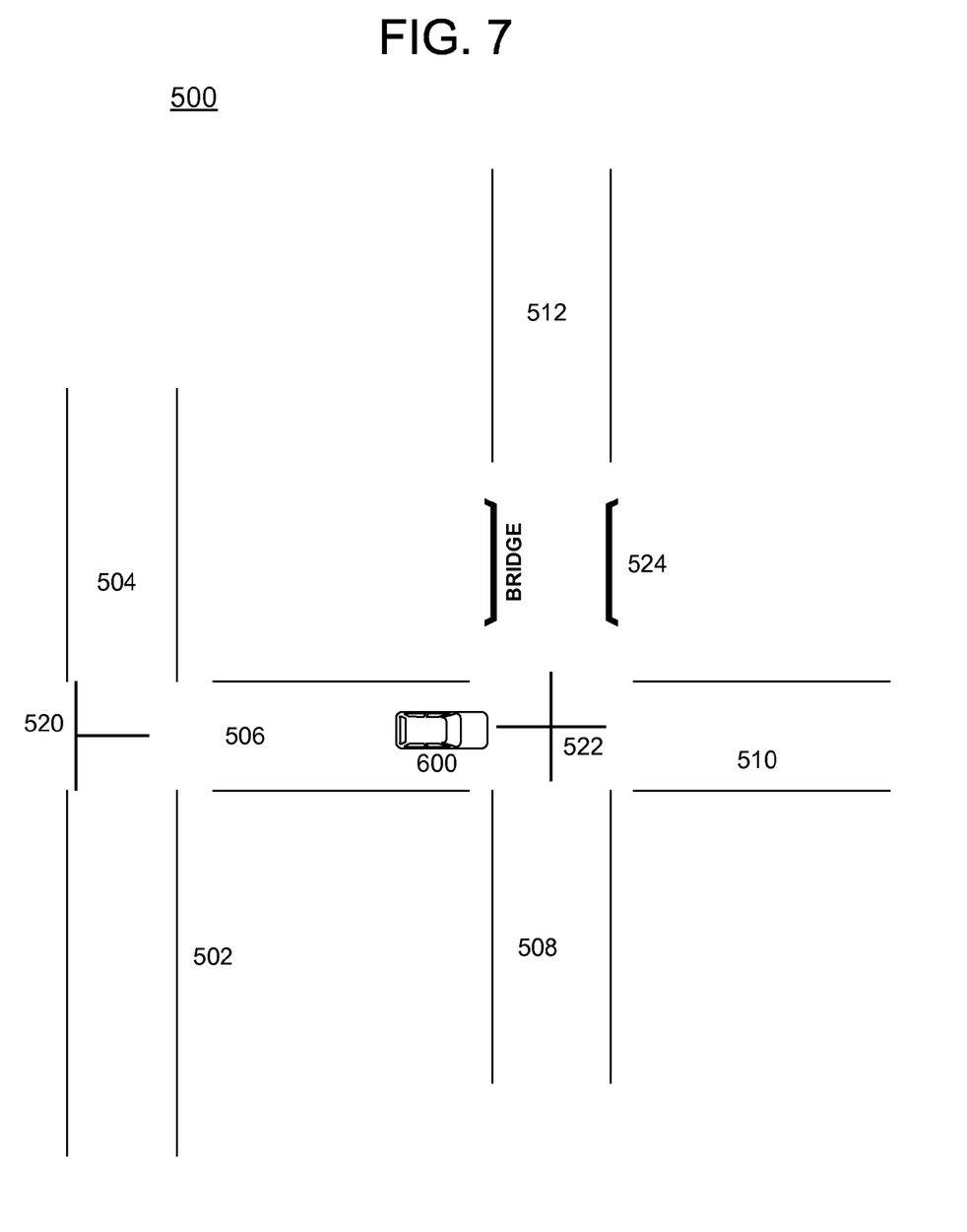
FIG. 7 is the schematic diagram of FIG. 6, in which the vehicle has advanced in accordance with an audible instruction from a language student.
Figure 8:
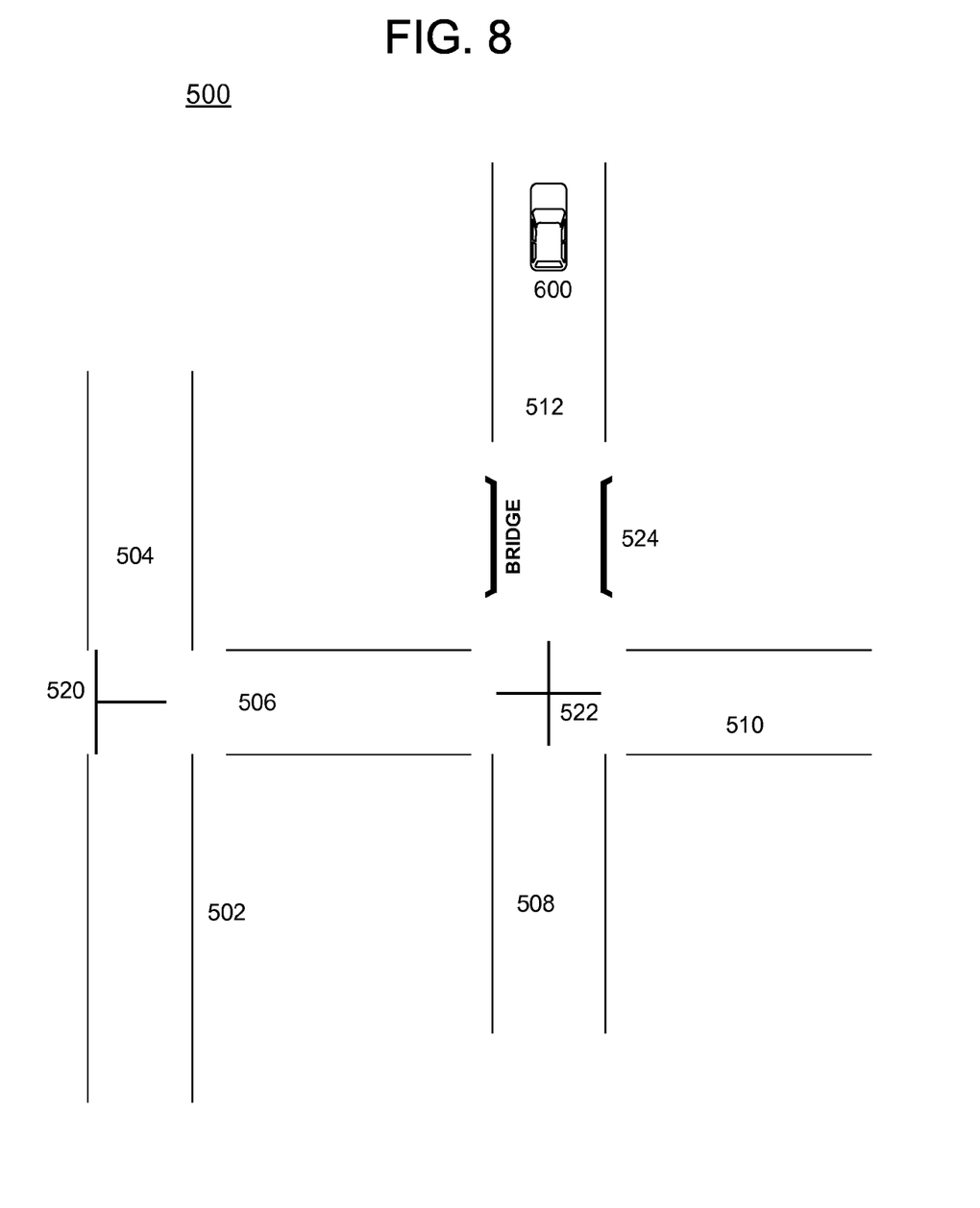
FIG. 8 is the schematic diagram of FIG. 7, in which the vehicle has advanced in accordance with an audible instruction from a language student.

Turning to FIG. 7, with vehicle 600 at intersection 522, student 102 may be prompted audibly and/or visually (using the display 154) to utter a command to control the subsequent action of vehicle 600. For the sake of this example, a case is considered in which, upon being prompted, student 102 audibly instructs system 150 that vehicle 600 is to turn left at intersection 522, by uttering "turn left". Thereafter, student 150 may utter further commands to advance vehicle 600, including "cross bridge" to advance vehicle 600 over bridge 524 and onto road segment 512, the result of which is shown in FIG. 8. Readers will appreciate that numerous other combinations of directional commands are possible within road system 500, and that the specific commands provided in the above example, are provided herein solely to illustrate the interplay between student 102 and system 150.

In the above manner, student 102 is uses commands having a meaning within a specific context rather than merely translating words from a source language to target language and vice-versa. The principles illustrated by the example discussed above may be readily employed in a variety of different graphical and audio contexts, and it will be appreciated that the use of navigation commands for a vehicle within road system 500 is merely a means of illustrating a concept that could be implemented in a wide variety of decision-making situations.

In an alternative embodiment, a schedule of commands with arbitrary names could be associated with the above-described directional commands, such as decisions to move forward, to cross bridges etc. For instance, if desired, a sequential task number could be assigned to each of the foregoing commands, and the student could be required to utter "task 1" or "task 2" instead of "turn left" or "turn right" at a given intersection.

The system can preferably use two words that have similar sounds in the target language, but no meaning associated with the desired command, as the two commands. For example, if learners of English pronounce "the" and "dah", the system might use The and duh as the commands for left and right, to help the student emphasize this pronunciation difference.

In still further preferred embodiments, the two or more words or phrases used as the commands can vary in response to a user's progress. That is, when the system indicates that the user has mastered the commands and the difference in pronunciation between the two, the system can instruct or require the user to change the command set to two different words, wherein the two different words may be even closer in pronunciation in the target language than the two prior words used as commands. Thus, as the user masters subtle pronunciation differences between words that are known to be particularly problematic for learners of the target language, the system can progressively work on harder and harder problems.

Figure 9:
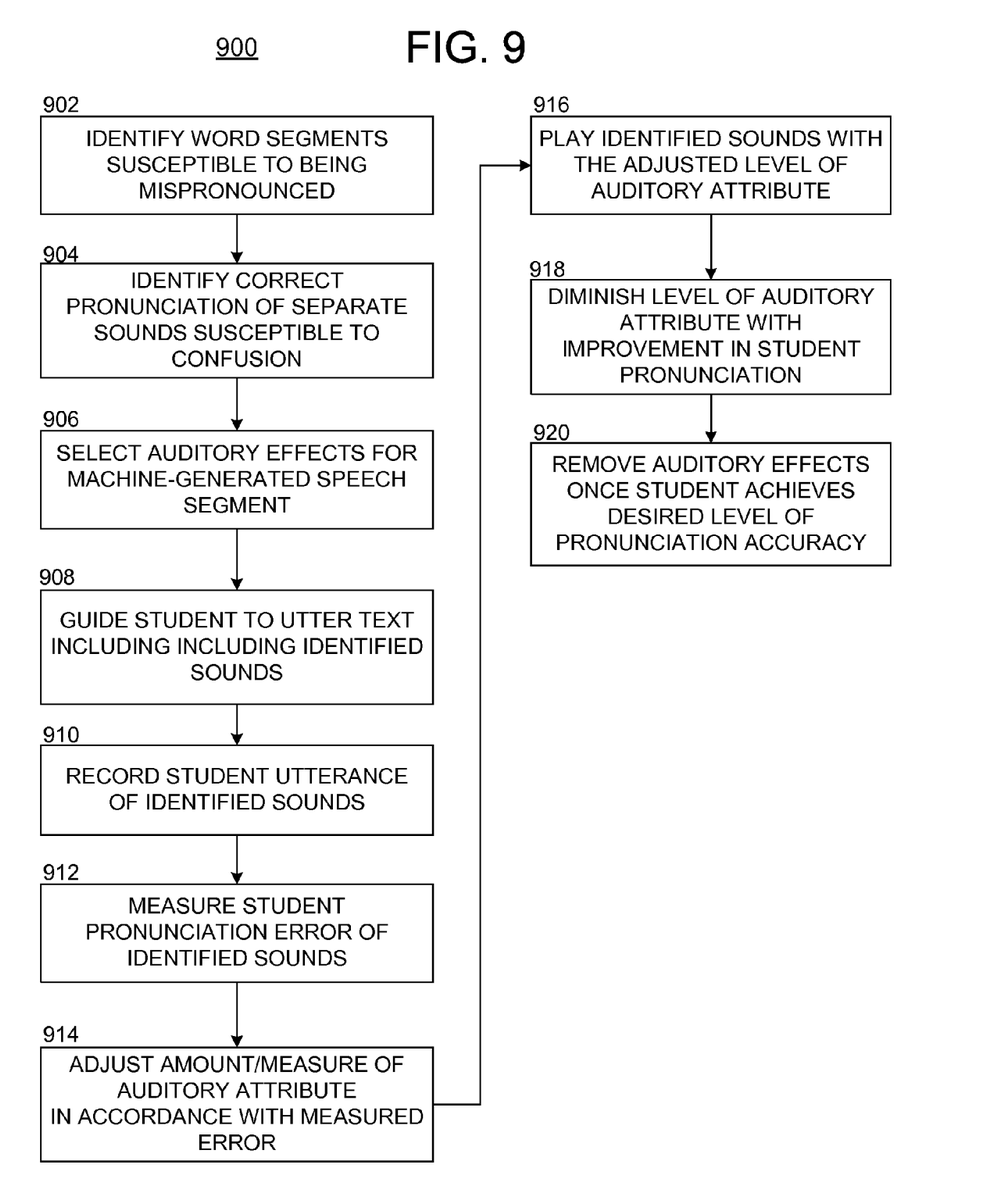
FIG. 9 is a flow diagram of a sequence of steps for improving the pronunciation of a language student using machine-induced pitch adjustments for selected sounds in accordance with an embodiment of the present invention.

FIG. 9 is a flow diagram of a sequence of steps for improving the pronunciation of a language student by changing selected auditory attributes of selected sounds in accordance with an embodiment of the present invention.

The method described below is directed to using auditory attributes of machine-generated speech to serve as cues for the pronunciation of a segment of speech, such as phonemes, syllables, letters, words, or other pertinent speech segment, for a language student 102. A general approach is provided in connection with FIG. 9, followed by a more specification application of the concept in connection with FIG. 10.

Method 900 may start at step 902, at which point speech segments (such as phonemes, syllables, letters, words) susceptible to being mispronounced, and/or groups of group segments susceptible to being pronounced in a confusingly similar way, may be identified. An example of a single speech segment being mispronounced is the tendency of students starting from some source languages (i.e. native languages) to pronounce the English word "the" as "duh", due to the absence of the "th" speech segment in various languages. An example of a group of separate speech segments being pronounced in a confusingly similar way is the tendency of speakers of certain source languages pronouncing the letters "L" and "R" in a confusingly similar manner.

At step 904, system 150 may identify the correct pronunciation for the speech segment to be audibly emphasized for the language student 102. A suitable data representation of the correct pronunciation may be stored in a computer file for the purpose of later comparison with a digitized representation of the student's utterance of a corresponding speech segment. The system 150 may also audibly play a sample of the pertinent speech segment to serve as an auditory template for the student to use as a guide in pronouncing the pertinent speech segment during the training method, and thereafter.

At step 906, the system 150 preferably selects an auditory effect to impart to the machine-generated version of the speech segment to serve as a cue to the language student to pay particular attention thereto. The intensity of the auditory attribute may have an initial level, which may be adjusted in accordance with the student's progress in pronouncing the pertinent speech segment. The intensity of the auditory effect may also be adjusted as a function of time, and/or other variable, such as the number of times the system 150 has audibly played the speech segment for the student.

The auditory attribute used for the machine-generated speech may be selected from a group of attributes that includes but which is not limited to: (a) pitch; (b) volume; (c) tone; (d) variation of the speed at which the speech segment is played; and/or (e) variation of the number of times the speech segment is played. It will be appreciated that the present invention is not limited by the auditory attributes listed above. The term "tone" (which may also be referred to as "tonal quality") above may refer to the distribution of harmonics employed when playing the speech segment using system 100, without necessarily altering the pitch of the speech segment.

In an alternative embodiment, the audible attribute may be replaced with a visual attribute. That is, rather than use two different pitches or other audible attributes to distinguish between the two words at issue, one could use two different shapes, colors, etc. As the user becomes more proficient in the distinction between the two words at issue, the visual prompt to assist in distinguishing the two could gradually fade, perhaps appear less often, or otherwise diminish to the point of not being as much help to the user.

At step 908, system 150 may guide student 102 through various words that include the speech segments for which pronunciation improvement is sought. System 150 may invite the student 102 to speak a text sequence using audio and/or visual prompts.

At step 910, the student 102 utterance of the words may be recorded. At step 912, recording of the student utterance of the speech segment at issue is compared to the previously established template, and a pronunciation error level is preferably calculated (step 912). Alternatively, the pronunciation error quantity may be determined by comparing the student utterance to the template in real time, without recording the student utterance.

At step 914, the setting of the auditory attribute imparted to the speech segment being taught may be adjusted in accordance the degree of progress in the student's 102 pronunciation, as measured in step 912. Thus, for example, if higher-than-normal volume is the auditory attribute used to emphasize the speech segment being taught to the student 102, and the student 102 has demonstrated progress in pronouncing the speech segment, the surplus volume may be reduced in step 914 to an extent commensurate with the extent of student progress measured in step 912. At step 916, the system 150 preferably plays the identified sounds using the auditory attribute set in step 914.

Thereafter, the magnitude of the alteration of the auditory attribute adjusted in step 914 may be gradually diminished (step 918) as the pronunciation of the student 102 gradually improves. Step 918 may represent an iterative repetition of steps 908 through 916 to achieve the desired improvement in student 102 pronunciation. At step 920, the machine-generated alteration of the originally occurring auditory attribute for the speech segment at issue may be removed completely once the student 102 achieves a desired level of pronunciation accuracy, as determined in the measuring step 912.

Figure 10:
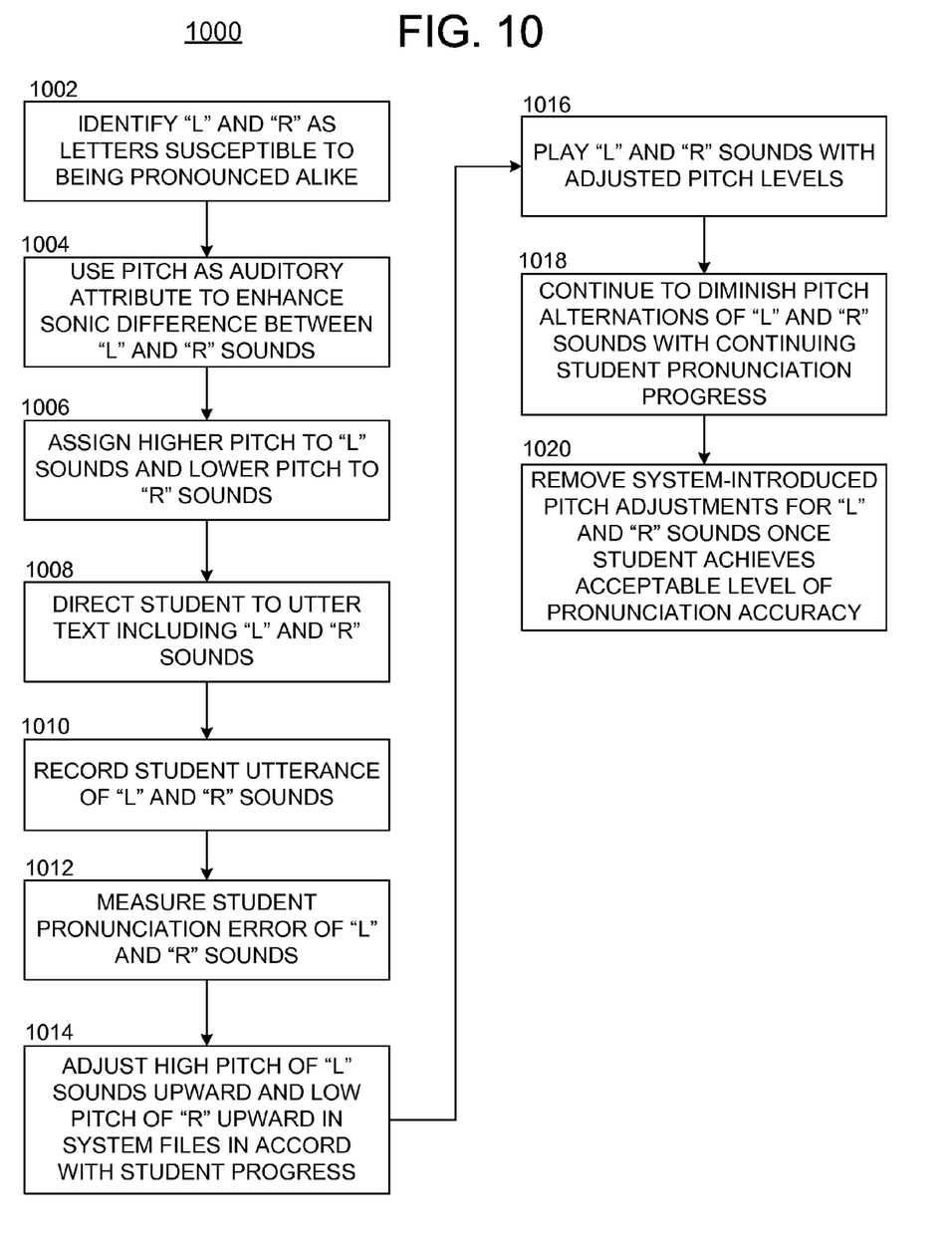
FIG. 10 is a flow diagram of a sequence of steps for applying the general approach of the method of FIG. 9 to a specific pronunciation application, in accordance with an embodiment of the present invention.

FIG. 10 is a flow diagram of a method of applying the concepts of the method of FIG. 9 to a more specific situation. Specifically, the method of FIG. 10 is directed to altering the pitch of the machine-generated play of "L" and "R" speech-segment sounds to guide a language student 102 to a correct pronunciation of these speech segments. However, it will be appreciated that the principles described herein are not limited to this specific pronunciation issue, and that the system and method disclosed herein may be employed to modify any speech segment in any language to suitably guide student of the language of instruction toward a correct pronunciation of the speech element at issue.

At step 1002, the method identifies the letters "L" and "R" as letters to being pronounced the same way, especially by students 102 having Japanese or other Asian languages as native tongues. However, it will be appreciated that methods described herein may be applied to a range of other speech segments (whether letters, syllables, phonemes, words etc) that are susceptible to being pronounced in a confusingly similar way.

At step 1004, system 150 selects pitch as the auditory attribute to employ to emphasize the distinction between the "L" and "R" sounds. As noted earlier herein, various auditory attributes could be modified to emphasize the sound of a consonant or other speech segment, and the present invention is therefore not limited to the use of pitch for this purpose.

At step 1006, system 150 preferably establishes a regime in which the pitch of "L" sounds is be raised with respect to a naturally occurring pitch level, and the pitch of "R" sounds is to be lowered with respect to the naturally occurring pitch level, within a text sequence to be played for the student 102 by the system 150. At step 1008, the system 150 directs the student 102 to utter a text sequence that preferably includes the "L" and "R" sounds of interest. The system 150 preferably records (step 1010) the student utterance and then measures (step 1012) the error level in the student 102 pronunciation of the "L" and "R" sounds in the uttered text sequence. In an alternative embodiment, the recording step could be omitted and the pronunciation error level could be determined in real time as the system 150 obtains digitized speech data from the student 102 utterance.

At step 1014, system 150 preferably adjusts the magnitude of the pitch alteration of the "L" and "R" sounds to an extent commensurate with the measurement (in step 1012) of the pronunciation error of the student 102. In general, the greater the student pronunciation error, the more system 150 will increase the pitch of the "L" sounds and decrease the pitch of the "R" sounds. At step 1016, system 150 plays the text that includes the "L" and "R" sounds with the adjusted pitch levels, for the student 102.

Thereafter, the magnitude of the pitch adjustments for the "L" and "R" sounds adjusted in step 1014 may be gradually diminished (step 1018) as the pronunciation of the student 102 gradually improves. Step 1018 may represent an iterative repetition of steps 1008 through 1016 to achieve the desired improvement in student 102 pronunciation of the "L" and "R" sounds. At step 1020, the machine-generated pitch adjustment may be removed from the "L" and "R" sounds completely, once the student 102 achieves a desired level pronunciation accuracy, as determined in the measuring step 912.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   identifying, via a processor at a language instruction device, a speech segment in a target language that is susceptible to mispronunciation by language learners;
   storing a data file including digital speech data representative of the speech segment;
   selecting an auditory attribute for use in playing the identified speech segment by the language instruction device;
   manipulating, via the processor, the data file to produce first manipulated digital speech data including a first altered level of the auditory attribute that differs from a naturally occurring level of the auditory attribute;
   playing, via a speaker operatively coupled to the language instruction device, the first manipulated digital speech data including at least one instance of the identified speech segment having the first altered level of the auditory attribute;
   receiving, from a language student and in response to the playing, a student utterance that includes the identified speech segment;
   converting, via the processor, the student utterance to digital utterance data;
   comparing, via the processor and in response to the converting, the digital utterance data with the digital speech data to define an error level of a pronunciation of the identified speech segment by the language student;
   manipulating, via the processor and based on the error level, the data file to produce second manipulated digital speech data including a second altered level of the auditory attribute; and
   playing, via the speaker, the second manipulated digital speech data including at least one instance of the identified speech segment having the second altered level of the auditory attribute.

2. The method of claim 1, further comprising:
   diminishing an extent of alteration of the first altered level of the auditory attribute of the first manipulated digital speech data played by the language instruction system as the error level of the pronunciation of the identified speech segment by the student declines.

3. The method of claim 1, wherein the identified speech segment is at least one of: (a) a letter; (b) a phoneme; (c) a syllable; or (d) a word.

4. The method of claim 1, wherein the auditory attribute includes at least one of: (a) pitch; (b) volume; (c) speed of play; or (d) tone.

5. The method of claim 1, wherein the receiving the student utterance includes recording the student utterance by the language instruction device.

6. A method, comprising:
   identifying, at a computer, a first speech segment and a second speech segment in a target language, the first speech segment and the second speech segment susceptible to being pronounced similarly by a language student;
   storing a first data file including digital speech data representative of the first speech segment and a second data file including digital speech data representative of the second speech segment;
   manipulating, at the computer, the first data file to produce first manipulated digital speech data including an increased pitch level of the first speech segment with respect to a normally occurring pitch level of the first speech segment;
   manipulating, at the computer, the second data file to produce second manipulated digital speech data including a decreased pitch level of the second speech segment with respect to a normally occurring pitch level of the second speech segment;
   playing, via a speaker operatively coupled to the computer, at least one instance of the first manipulated digital speech data and at least one instance of the second manipulated digital speech data;

receiving, from the language student and in response to the playing, a student utterance of the first speech segment and a student utterance of the second speech segment;

converting, at the computer, the student utterance of the first speech segment to first digital utterance data and the student utterance of the second speech segment to second digital utterance data;

comparing, at the computer, the first digital utterance data with the digital speech data representative of the first speech segment to define a first error level of the student utterance of the first speech segment;

comparing, at the computer, the second digital utterance data with the digital speech data representative of the second speech segment to define a second error level of the student utterance of the second speech segment; and gradually reducing, at the computer, an amount of manipulation of the first data file and the second data file as the first error level and the second error level decline.

7. The method of claim 6, wherein the first speech segment includes an utterance of the letter "L," and the second speech segment includes an utterance of the letter "R".

8. The method of claim 7, further comprising:

receiving, at the computer, input from the language student, the input including an utterance of a second text sequence that includes at least one utterance of the letter "L" and at least one utterance of the letter "R".

9. The method of claim 8, further comprising:

measuring an error level of a pronunciation of the at least one utterance of the letter "L" and the at least one utterance of the letter "R".

10. The method of claim 6, wherein:

the manipulating the first data file includes adjusting a pitch level of an utterance of the letter "L" in the first file at the computer, in accordance with a measured error level of the pronunciation of the letter "L"; and the manipulating the first data file includes adjusting a pitch level of an utterance of the letter "R" in the second data file at the computer, in accordance with a measured error level of the pronunciation of the letter "R".

* * * * *